United States Patent [19]

Hill, Jr. et al.

[11] Patent Number: 5,057,866

[45] Date of Patent: Oct. 15, 1991

[54] REMOTELY ACCESSIBLE COPIER CALCULATOR

[75] Inventors: John R. Hill, Jr., W. Brighton; Jeff C. Carter, Fairport, both of N.Y.

[73] Assignee: Xerox Corporation, Stamford, Conn.

[21] Appl. No.: 519,511

[22] Filed: May 4, 1990

[51] Int. Cl.⁵ ............................................. G03L 15/00
[52] U.S. Cl. .................................. 355/200; 355/205
[58] Field of Search ....................... 355/200, 203–207, 355/208, 209; 371/16.4, 29.1; 364/518, 525, 551.01

[56] References Cited

U.S. PATENT DOCUMENTS

| | | | |
|---|---|---|---|
| 3,916,177 | 10/1975 | Greenwald | 371/29.1 X |
| 4,186,299 | 1/1980 | Batchelor | 371/16.4 |
| 4,464,044 | 8/1984 | Matsuyama | 355/209 |
| 4,478,509 | 10/1984 | Daughton et al. | 355/200 X |
| 4,536,079 | 8/1985 | Lippolis et al. | 355/206 |
| 4,583,834 | 4/1986 | Seleo et al. | 355/206 |
| 4,589,080 | 5/1986 | Abbott et al. | 355/208 X |
| 4,639,918 | 1/1987 | Linkowski | 371/16.4 |
| 4,745,602 | 5/1988 | Morrell | 371/16.4 |
| 4,970,557 | 11/1990 | Masuda et al. | 355/208 X |

FOREIGN PATENT DOCUMENTS 55-117165 9/1980 Japan .................................. 355/205

Primary Examiner—Joan H. Pendegrass
Attorney, Agent, or Firm—Ronald F. Chapuran

[57] ABSTRACT

A technique for monitoring machine status conditions and initiating communicating with a remote computer relative to the status conditions of the machine comprising the steps of monitoring with a calculator the predetermined status conditions relative to the operation of the machine, recognizing the deviation of the machine operation from said predetermined status conditions, responding to the deviation of the machine operation from the predetermined status conditions, automatically initiating the communication of a message to the remote computer regarding said deviation of the machine from the predetermined status conditions, and remotely altering the pretermined status conditions by which to monitor the machine.

10 Claims, 3 Drawing Sheets

REMOTELY ACCESSIBLE COPIER CALCULATOR

BACKGROUND OF THE INVENTION

The invention relates to reproduction machines, and more particularly, to a machine capable of responding to deviations from threshold parameters to initiate communication with a remote station and in addition the remote station being capable of altering the threshold parameters and/or machine procedures.

Modern day reproduction machines such as printers and copiers utilize a software based operating system to perform essential machine functions and implement the various printing and copying jobs of which the machine is capable. However, software, particularly that used in high speed multi-function machines, is subject to various problems and faults. Additional problems also arise with the machine hardware which in machines of this type is extremely complex and sophisticated. Hardware and software problems that occur typically happen at a low non-periodic rate and thus are very difficult to replicate when servicing the machine and therefore difficult to satisfactorily resolve.

Internal diagnostic tools such as diagnostic algorithms that respond to various sensors and detectors within the machine are very helpful in analyzing and maintaining the operation of the machine. However, the diagnostics can be variable depending upon such factors as machine environment, history of operation, or any additional knowledge that has been gained regarding a machine. Also, a machine control often does not have the requisite sophistication to be able to analyze all complex problems. In this respect, it can be understood that it would be desirable to provide diagnostic algorithms that are capable of being adjusted to provide different diagnostic criteria for changing machine conditions or environments. It would also be desirable for a machine to be able to analyze its internal operation and provide a diagnostic alert to a remote diagnostic station.

PRIOR ART

U.S. Pat. No. 4,186,299 to Batchelor, assigned to Xerox Corporation, and the U.S. Pat. No. 4,464,044 to Matsuyama disclose copying machines having keypads primarily for directing normal copying operations. The keypads and associated logic also serve the additional function of initiating diagnostic routines.

U.S. Pat. No. 4,536,079 to Lippolis et al. discloses a copying machine keyboard that is usable by a service agent to change a timing parameter for diagnostic and repair purposes.

U.S. Pat. No. 4,478,509 to Daughton et al., assigned to Xerox Corporation, discloses a control. console which can be used to direct copy or other runs. See column 18, line 60.

U.S. Pat. No. 4,639,918 to Linkowski discloses a calculator keyboard that is used to control diagnostic functions of a mailing machine. During regular operation, the same key pad is used to control the normal functioning of the machine.

A difficulty with the prior art systems is that remote communication with an expert system is not available nor the means to initiate communication by the system with the expert system. In addition, the prior art systems do not provide a remote means to alter diagnostic parameters and/or machine procedures.

It is an object of the present invention, therefore, to provide a new and improved technique that allows remote communication with an expert system and the means to initiate communication by the machine control system with the expert system, as well as a remote means to alter diagnostic parameters and/or machine procedures. It is a further object of the present invention to provide a tool or simple calculator using a sequence of commands to access machine parameters stored in memory and to use these parameters for determining threshold level variance. It is a further object of the present invention to provide the means to remotely change the calculations and threshold levels used by the calculator to judge machine performance. Further advantages of the present invention will become apparent as the following description proceeds and the features characterizing the invention will be pointed out with particularity in the claims annexed to and forming a part of this specification.

SUMMARY OF THE INVENTION

Briefly, the present invention is a technique for monitoring machine status conditions and initiating communication with a remote computer relative to the status conditions of the machine comprising the steps of monitoring with a calculator the predetermined status conditions relative to the operation of the machine, recognizing the deviation of the machine operation from said predetermined status conditions, responding to the deviation of the machine operation from the predetermined status conditions, automatically initiating the communication of a message to the remote computer regarding said deviation of the machine from the predetermined status conditions, and remotely altering the pretermined status conditions by which to monitor the machine.

BRIEF DESCRIPTION OF THE DRAWINGS

For a better understanding of the present invention, reference may be had to the accompanying drawings in which.

DETAILED DESCRIPTION OF THE PREFERRED EMBODIMENT

Figure 1:
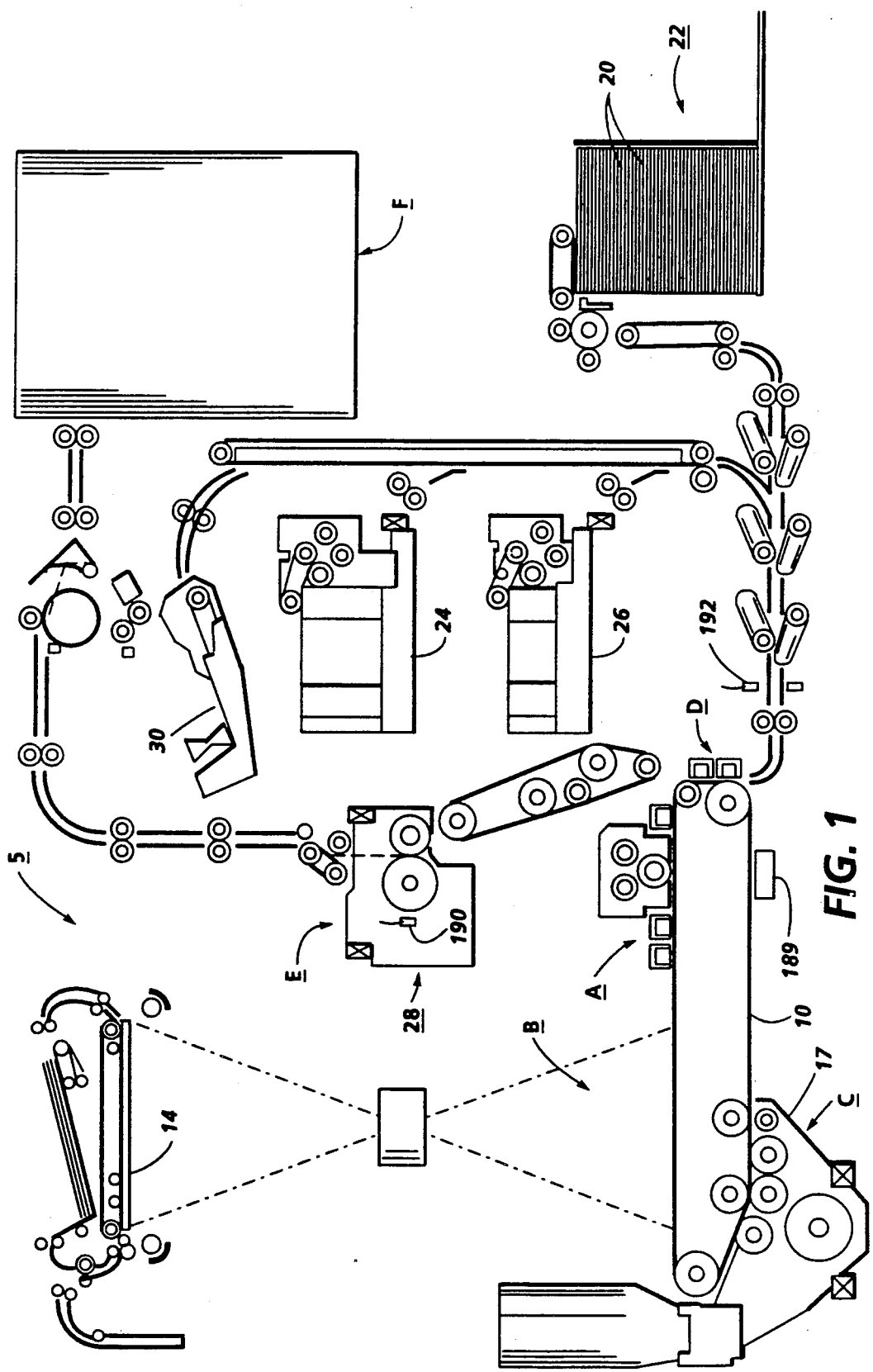
FIG. 1 is a schematic elevational view depicting various operating components and sub-systems of a typical machine incorporating the present invention.
Figure 2:
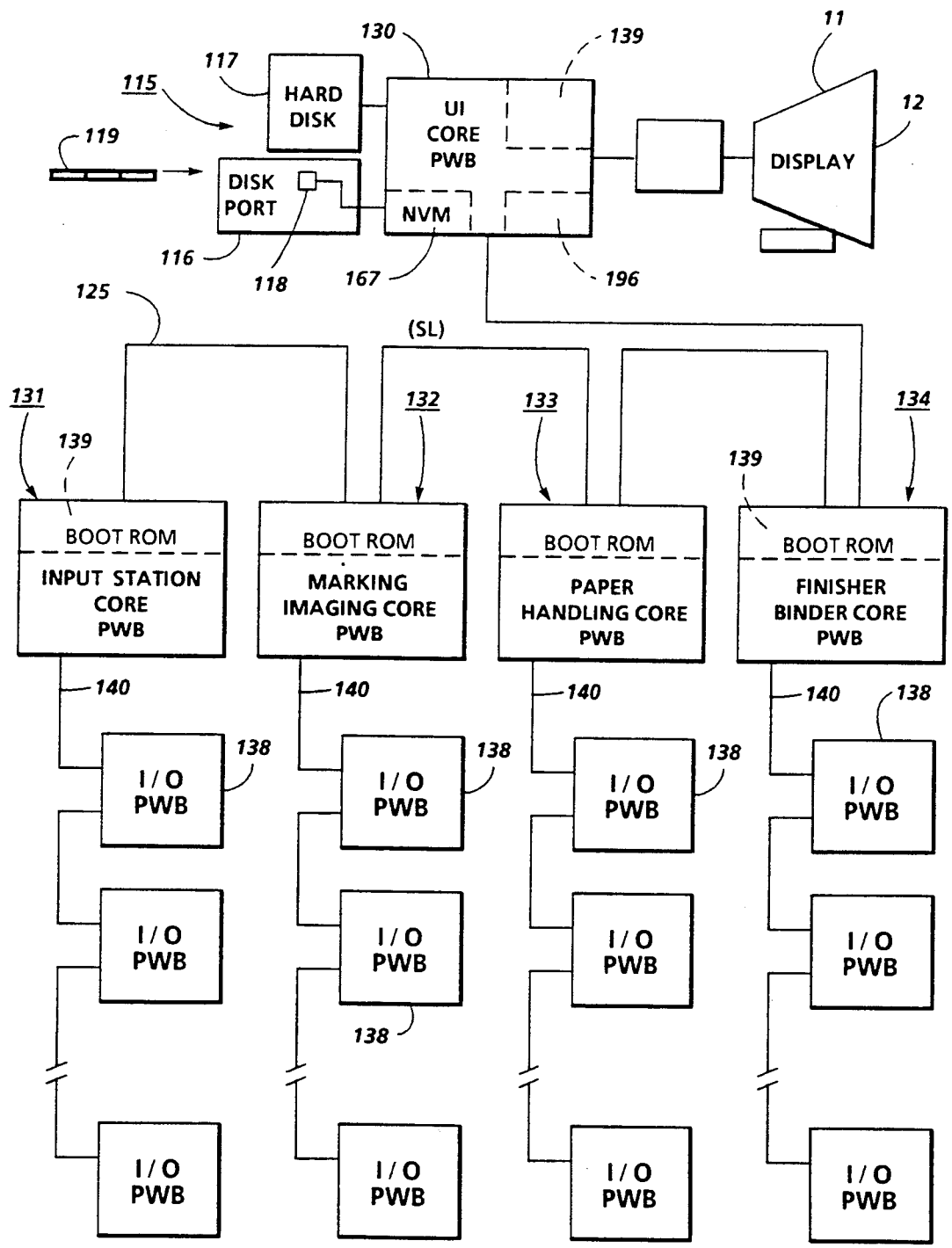
FIG. 2 is a block diagram depicting the machine Operating System Printed Wiring Boards and shared line connections for the machine described in FIG. 1.

For a general understanding of the features of the present invention, reference is made to the drawings. In the drawings, like reference numerals have been used throughout to identify identical elements. Referring to FIGS. 1 and 2, there is shown an electrophotographic reproduction machine 5 composed of a plurality of programmable components and sub-systems which cooperate to carry out the copying or printing job programmed through a touch dialogue screen 12 of a User Interface (UI) 11.

Machine 5 has a photoreceptor in the form of a movable photoconductive belt 10 which is charged at charging station A to a relatively high, substantially uniform potential. Next, the charged photoconductive belt is advanced through imaging station B where light rays reflected from the document being copied on platen 14 create an electrostatic latent image on photoconductive belt 10.

The electrostatic latent image is developed at development station C by a magnetic brush developer unit 17 and the developed image transferred at transfer station D to a copy sheet 20 supplied from tray 22, 24, or 26. Following transfer, the copy sheet bearing the transferred image is fed to fusing station E where a fuser 28 permanently affixes the toner powder image to the copy sheet. After fusing, the copy sheets are fed to either finishing station F or to duplex tray 30 from where the sheets are fed back to transfer station D for transfer of the second toner powder image to the opposed sides of the copy sheets.

Referring to FIG. 2, operation of the various components of machine 5 is regulated by a control system which uses operating software stored in memory 115 to operate the various machine components in an integrated fashion to produce copies and prints. The control system includes a plurality of printed wiring boards (PWBs), there being a UI core PWB 130, an Input Station core PWB 131, a Marking Imaging core PWB 132, a Paper Handling core PWB 133, and a Finisher Binder core PWB 134 together with various Input/Output (I/O) PWBs 138. A Shared Line (SL) 125 couples the core PWBs 130, 131, 132, 133, 134 with each other and with memory 115 while local buses 140 serve to couple the I/O PWBs 138 with each other and with their associated core PWB. Programming and operating control over machine 5 is accomplished through touch dialogue screen 12 of UI 11. The operating software includes applications software 150 for implementing and coordinating operation of the machine components.

Memory 115 includes a main memory in the form of a hard or rigid disk 117 on which the machine operating software is stored. On machine power up, the operating software is loaded from memory 115 to UI core PWB 130 and from there to the remaining core PWBs 131, 132, 133, 134 via SL 125. Disk 117 preferably comprises two platter, four head disks with a formatted storage capacity of approximately 20 megabytes. Additional ROM, RAM, and NVM memory types are resident at various locations within machine 5, with each core PWB 130, 131, 132, 134 having a boot ROM 139 for controlling downloading of operating software to the PWB, fault detection, etc. A NVM 167 and calculator 196 are provided in UI core PWB 130. Boot ROMs 139 also enable transmission of operating software and control data to and from PWBs 130, 131, 132, 134 via SL 125 and control data to and from I/O PWBs 138 via local buses 140.

A floppy disk port 116 provides program loading access to memory 115 for the purpose of entering changes to the operating software, loading specific programs such as diagnostic programs, retrieving stored data such as machine faults, etc. using floppy disks 119. Port 116 includes a suitable read/write head 118 for reading and/or writing from and to a disk 119 in port 116. Floppy disks 119 preferably comprise 3.5 inch, dual sided micro disks with a formatted storage capacity of approximately 720 kilobytes.

Figure 3:
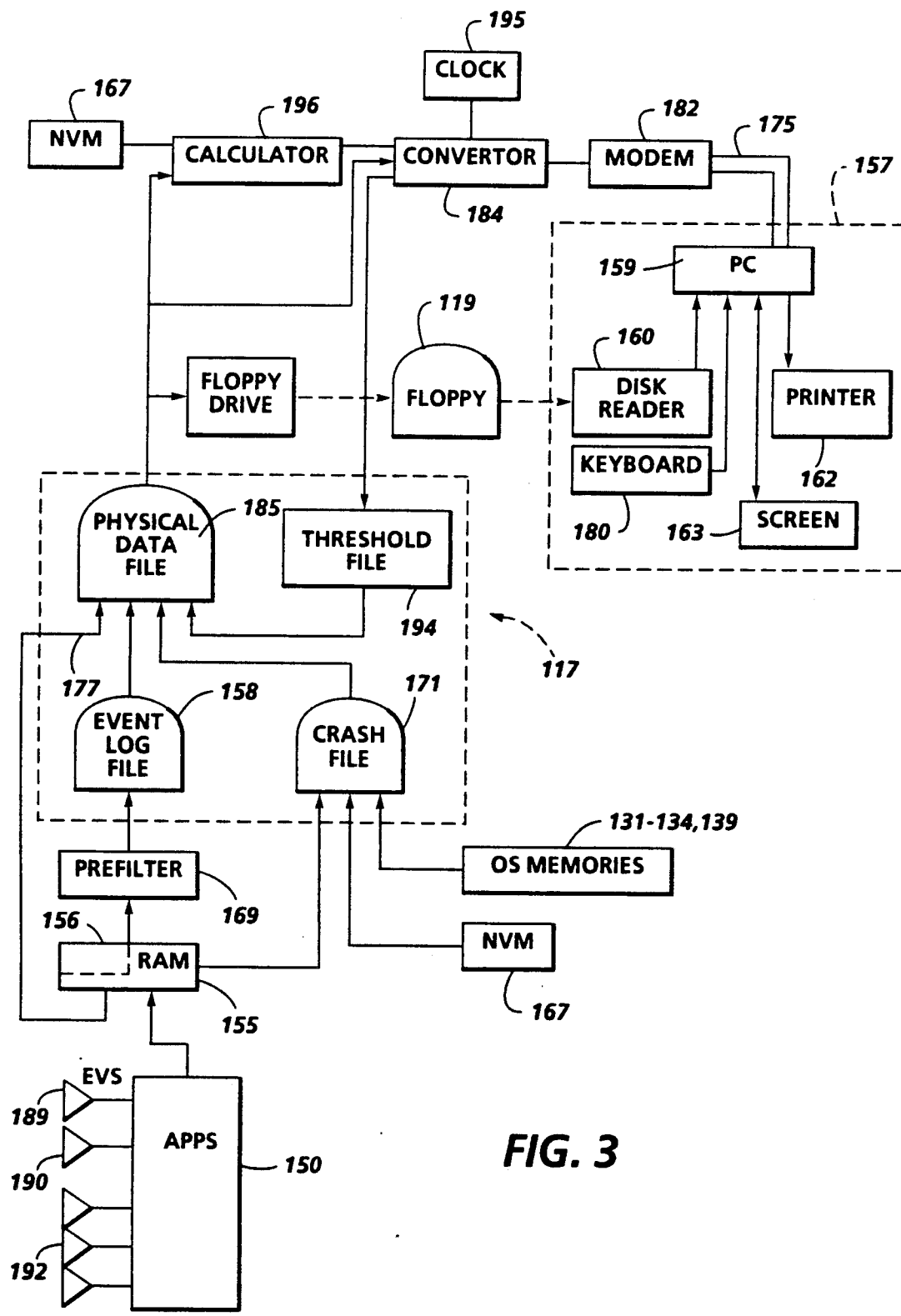
FIG. 3 is a block diagram depicting the remote communication and the calculator in accordance with the present invention.

Referring to FIGS. 3, certain key machine operating events (referred to as current event data) which define the proper execution of the control system such as user interface buttons being set, changes in application software operating states, interlock switches opening and closing, notification of control or system faults, execution of key routines, etc., are input as they occur by the applications system software 150 through occurrence logger software to dynamic memory 155. Memory 155, which may be Random Access Memory or RAM type memory, provides a circular buffer 156 of predetermined size for storing current event data.

A data transfer means in the form of an event spooling routine in software, which is periodically called, writes the current event data accumulated in buffer 156 of RAM 155 via a suitable pre-filter 169 into an event or occurence logger file 158 on disk 117. Typically, the event spooling routine is repeated on a given cycle, i.e., after a preset number of machine pitches. When called, the event spooling routine overwrites a portion of the previous event data stored in the event logger file 158 with the current event data, effectively erasing the previously oldest portion of the event data and replacing it with the newer current event data.

Pre-filter 169 serves to selectively discard certain portions of the event data, the retention of which in event logger file 158 is not desired. Where it is desired to store all of the event data in file 158, pre-filter 169 may be dispensed with.

In the event it is desired to access the event data in event logger file 158, as for example when servicing machine 10, a floppy disk 119 may be inserted into the disk drive 116 and event logger file 158 accessed to write the event data in file 158 on disk 119. Disk 119 may then be taken to a service site 157 having a suitable computer such as a personal computer (PC) 159 with floppy disk reader 160 and printer 162. Site 157 may be either a co-location with machine 10 or a remote location. PC 159 has conventional software for converting the byte type event data to ASCII data to enable printout by printer 162 onto hard copy for study and analysis as when diagnosing, servicing, repairing, etc. machine 10. Alternately, or in addition, the event data may be displayed on the CRT screen 163 of PC 159.

Software crashes may occur from time to time during the life of machine 10. In the case of most crashes, recovery is made either automatically or through the intervention of the operator, and machine 10 continues to operate normally. However, a record of the machine state at the time of the crash for use in diagnosing, servicing, etc. machine 10. can be provided as described in pending application U.S. Ser. No. 07/342131 filed Apr. 24, 1989 and incorporated herein.

Machine 10 may also employ Remote Interactive Communications (RIC) to enable the transfer of selected machine operating data (referred to as machine physical data) to a remote site such as service site 157 through a suitable communication channel, exemplified here by telephone line 175. The machine physical data may be transmitted to the remote site automatically at predetermined times and/or in response to a specific request from the remote site.

A communication modem 182 is provided for machine 10 at the machine site, modem 182 serving to connect line 175 to machine 10 for transmittal of the machine physical data from machine 10 to the site 157. A computer such as PC 159 with suitable input such as keyboard 180 is provided at the remote site 157 for use in establishing communication with modem 182 for transmission of data from machine 10 via line 175 to site 157. A suitable data bandwidth converter 184 converts the machine data to the clock rate required for transmission over line 175, it being understood that the rate at which data is handled by machine 10 is ordinarily different and typically substantially greater than the data transmission rate of telephone line 175. In this regard, a clock 195 is connected to converter 184. The clock 195 is used to determine frequency of testing the state of the machine, for possible transfer of an alert.

The machine physical data to be transmitted, which may include some or all of the event data in event logger file 158 and/or the crash data from crash logger file 171, is obtained from time to time during operation of machine 10 and stored in a physical data file 185 on disk 117.

Certain machine operating parameters such as photoreceptor belt charge levels, fuser temperatures, etc. are permanently stored in NVM 167. These parameters represent the optimum or ideal operational settings for the machine which will result in the best possible machine performance. Typically, these operating parameters provide an operating range or window. Suitable sensors (seen also in FIG. 1) such as an Electrostatic Voltmeter (ESV) 189 for sensing photoreceptor charge levels, temperature sensor 190 for sensing the operating temperatures of fuser 28, sheet jam detectors 192 for detecting sheet jams and determining sheet timing, etc. monitor actual machine operating conditions. At discrete times during the operating cycles of machine 10, the sensors such as ESV 189, temperature sensor 190, jam detectors 192, etc. are read and the data obtained input to the machine physical data file 185 or NVM 167 for transmission via line 175 to the remote site.

In accordance with the present invention, with reference to FIG. 3, a threshold file 194 on the rigid disk 117 stores critical machine operating threshold levels for the machine operating components such as the photoreceptor belt charge levels, fuser tempertures, and bias control levels. Although shown separately, the theshold file 194 is a portion of the comprehensive physical data file 185. As discussed above various sensors and detectors monitor machine operating conditions and at discrete times during the operating cycle of the machine, these conditions are read and the data stored in the event logger file 158 and/or the crash logger file 171 to be stored in the physical data file 185 to be transmitted to the remote station 157 over line 175. Additional data (not shown) can be stored in physical data file. The remote station 157 can have access to almost all non-dialogue related information on the machine.

Such information stored in the physical data file 185 is available to the calculator 196, as is the threshold file 194, and NVM 167. Preferably the calculator 196 is implemented using a reverse polish notation logic system with a stack having a double word width (32 bits) and 5 elements in height. The automatic operations supported are addition, subtraction, multiplication and division, and the logical operations NOT AND OR OR. In a specific embodiment, the relational tests are less than, greater than, less than equal to, greater than equal to, not equal, and equal. Relational tests also provide a Boolean (true or false) response. Data can be passed as a constant or can be read as a variable from machine memory.

Calculator 196 inserts selected sensor and detector information into a given or predetermined mathematical model to determine if given machine operating thresholds are exceeded. For example, the electrostatic volt meter 189 senses photoreceptor charge levels. The threshold file 194 includes a range of voltages applicable to the photoreceptor charge for normal operation of the machine. The calculator 196 determines if the most recently sensed photoreceptor charge level is within the acceptable charge level or exceeds the charge level or is below the charge level. It should be noted that the threshold levels are values stored in the threshold file 194 and need not be a function of merely one sensor or detector reading, but a threshold level may be a function of, or based upon a combination of many machine variables that are determined by a plurality of sensors and detectors.

The calculator 196 periodically reviews the state of the machine to determine if there is a threshold level or value that is outside the range of acceptable machine operation stored in the threshold file 194. If all threshold levels are determined to be within acceptable machine operation, no action is taken by the calculator 196. However, in accordance with the present invention, if it is determined that the sensed values from the sensors and detectors represent a condition that is outside the range or accepted levels of threshold values as stored in threshold file 194, the calculator 196 will initiate a diagnostic alert that is transmitted through the modem 182 over the line 175 to the remote PC 159. This diagnostic alert is not initiated by the remote station 157, but is initiated internally within the machine 10 by the calculator 196 in response to the calculator 196 monitoring detector and sensor information in relation to threshold levels stored in the threshold file 194. In response to the diagnostic alert, remote station 157 is capable of responding and analyzing to data related to the diagnostic alert to indicate corrective action. It should be noted that the calculator can be preset to monitor the threshold levels at any given periodic frequency.

In accordance with another aspect of the present invention, it may be necessary for a particular machine envirnment to change the threshold values or levels that are stored in threshold file 194, or to change the mathematical model or formula used by calculator 196 to determine if the sensed and detected values exceed a threshold value. For example, it may be necessary to place a different emphasis or weight on the variables in the mathematical formula that are used to determine if the threshold level is exceeded, or it may be even desirable to add or delete some of the variables in the mathematical formula that are used by calculator 196 to determine if the threshold level has been exceeded. By the use of the keyboard 180 at the remote site 157, a changed mathematical formula or even a new mathematical formula can be provided to calculator 196 from PC 159 via modem 182 and telephone line 175.

Upon the changing of the model equations or parameters used by calculator 196 to determine that sensed conditions are within a threshold range, the calculator 196 will then determine a threshold exceeding level based upon the new mathematical formula for all subsequent sensed and detected values. The use of the new mathematical formulas for determining threshold levels and even the changed threshold ranges or values themselves will continue until the mathematical formulas and threshold levels are again remotely changed via the remote station 157. Any suitable technique for altering the mathematical formulas of the calculator 196 or the threshold levels in file 194 can be used at the remote station 157 such as a sequence of commands and key strokes.

While the invention has been described with reference to the structure disclosed, it is not confined to the details set forth, but is intended to cover such modifications or changes as may come within the scope of the following claims.

We claim:

1. In a printing system having a host computer and a machine with a plurality of operating components, a control, and a calculator, the control cooperating with the operating components to produce images on copy sheets, the calculator monitoring predetermined status conditions of the machine for communication to the host computer, the machine being remotely interconnected to the host computer, the method of the machine monitoring the status conditions and initiating communication with the host computer relative to the status conditions of the machine comprising the steps of:

monitoring with the calculator said predetermined status conditions relative to the operation of the machine, recognizing the deviation of the machine operation from said predetermined status conditions, responding to the deviation of the machine operation from said predetermined status conditions, automatically initiating the communication of a message to the remote computer regarding said deviation of the machine from the predetermined status conditions and remotely altering the predetermined status conditions by which to monitor the machine.

2. The method of claim 1 wherein the control provides status conditions related to the operating components and the step of monitoring with the calculator said predetermined status conditions relative to the operation of the machine includes the step of determining a variation of the status conditions from a threshold level.

3. The method of claim 2 wherein the step of determining the variation of the status points from a threshold level includes the step of calculating a value in accordance with a given equation related to the status conditions.

4. The method of claim 3 including the steps of providing a different value or a different equation related to the status conditions.

5. The method of claim 4 including the step of adjusting selected operating components of said machine remotely from said host computer.

6. The method of claim 5 wherein the host computer communicates with the machine calculator via a dedicated transmission line.

7. In a printing system having a host computer and a machine with a plurality of operating components, a control, and a calculator, the control cooperating with the operating components to produce images on copy sheets, the calculator monitoring predetermined status conditions of the machine for communication to the host computer, the machine being remotely interconnected to the host computer, the method of the machine monitoring the status conditions and initiating communication with the host computer relative to the status conditions of the machine comprising the steps of:

monitoring with the calculator said predetermined status conditions relative to the operation of the machine, recognizing the deviation of the machine operation from said predetermined status conditions, and remotely altering the predetermined status conditions by which to monitor the machine.

8. The method of claim 7 wherein the control provides status conditions related to the operating components and the step of monitoring with the calculator said predetermined status conditions relative to the operation of the machine includes the step of determining a variation of the status conditions from a threshold level.

9. In a printing system having a machine with a plurality of operating components, a control, and a calculator, the control cooperating with the operating components to produce images on copy sheets, the calculator monitoring predetermined status conditions of the machine for remote communication, the method of machine monitoring the status conditions comprising the steps of:

monitoring with the calculator said predetermined status conditions relative to the operation of the machine, recognizing the deviation of the machine operation from said predetermined status conditions, responding to the deviation of the machine operation from said predetermined status conditions, and remotely altering the pretermined status conditions by which to monitor the machine.

10. The method of claim 9 including the step of automatically initiating a remote communication in response to said deviation of the machine from the predetermined status conditions.

* * * * *